United States Patent
Copley

(10) Patent No.: US 6,526,137 B1
(45) Date of Patent: Feb. 25, 2003

(54) SYSTEM AND METHOD OF PERFORMING FORCED DEFAULT ROUTING OF CALLS

(75) Inventor: Jeffrey D. Copley, Garland, TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/470,658

(22) Filed: Dec. 22, 1999

(51) Int. Cl.[7] .............................................. H04M 7/00
(52) U.S. Cl. .................... 379/221.03; 379/229
(58) Field of Search ................ 379/221.03, 220.01, 379/229, 230, 207.14

(56) References Cited

U.S. PATENT DOCUMENTS

| | | | |
|---|---|---|---|
| 5,943,411 A | * 8/1999 | Houck et al. | 379/211.02 |
| 5,949,871 A | * 9/1999 | Kabay et al. | 370/389 |
| 6,130,940 A | * 10/2000 | Wong et al. | 379/201.01 |

* cited by examiner

Primary Examiner—Ahmad F. Matar
Assistant Examiner—Hector Agdeppa
(74) Attorney, Agent, or Firm—Baker Botts, LLP; V. Lawrence Sewell; Craig A. Hoersten

(57) ABSTRACT

A telecommunications network (1) includes a signal transfer point (10) that receives an initial address message from a service switching point (12). The signal transfer point (10) determines whether a Forward Call Identifier (FCI) "m" bit has been set indicating that a local number portability (LNP) query has been performed. If the FCI "m" bit has been set, then the signal transfer point (10) performs normal call processing. If the FCI "m" bit is not set, the signal transfer point (10) will set the FCI "m" bit to one prior to performing normal processing if a database interrogation is not activated. If database interrogation is activated, the signal transfer point (10) interrogates a LNP database 24 to determine whether the dialed subscriber has been ported and/or resides in a receiving network. The signal transfer point (10) will set the FCI "m" bit in response to either the dialed subscriber not being ported or not residing in the receiving network prior to normal processing. The FCI "m" bit will remain at a zero state if the dialed subscriber has been ported and resides in the receiving network.

20 Claims, 2 Drawing Sheets

SYSTEM AND METHOD OF PERFORMING FORCED DEFAULT ROUTING OF CALLS

TECHNICAL FIELD OF THE INVENTION

This invention is related in general to telecommunications call processing and more particularly to a system and method of performing forced default routing of calls.

BACKGROUND OF THE INVENTION

The network evolution as a result of the Telecommunication Act of 1996 has resulted in the need for specific procedures to support the ability of customers to change from one telecommunications service provider to another (hereafter referred to as Number Portability (NP)). Specific procedures and standards were developed by the telecommunications industry to support NP. The magnitude of these changes are significant and have created situations that can potentially stress network technology to the point of a catastrophic network event. Scenarios of financial management have also been created.

In most cases, a query is required for call delivery in an NP environment. The query consists of a Signaling System Number 7 (SS7) message sent from a query-originating switch to a network database to obtain the necessary routing information to route the call. The solution to achieve this is called the Location Routing Number (LRN) solution. When a customer places a call to a ported subscriber, the dialed number is sent in a query to the LRN application. The application returns the LRN which is then used by the querying switch and subsequent switches to route the call to the network element that has the same Network Routing Address (NRA) as the LRN. The querying switch places the called number into the Generic Address Parameter (GAP) of the IAM and marks the call as a queried call. This instructs downstream switching equipment that further querying is not necessary. It also provides the far-end switch with the appropriate dialed number information. Upon receipt at the far-end switch, the GAP and Called Party Address are reversed for service support and call completion.

The volume of queries to be performed in a network consists of wireless to wireline calls and calls that previously have not been dipped prior to arriving in the receiving network. This volume can be significant based on the number of non-queried calls delivered to the receiving network. Non-queried calls come from Competitive Local Exchange Carrier (CLECs) networks and Inter-exchange Carrier (IECs) networks that do not have the ability to perform queries or for some reason one or more of these networks did not perform the NP query (for example, a network outage of the NP Database). Of note, wireless networks were not scheduled to have query capabilities until Dec. 31, 1998 as indicated in the Telecommunications Act of 1996. As such, they will deliver traffic as normal to the incumbent wireline networks and expect the incumbent networks to perform the necessary NP query processing. The incumbent networks must have sufficient capacity engineered to handle this expanded need. The incumbent network is also allowed some form of cost recovery and management.

An incumbent network may be flooded with non-queried messages due to an event in an adjacent network. A failure in the adjacent network may cause all calls to be default routed to the incumbent network. This type of event could foreseeably drive the incumbent's network equipment beyond its engineered capacity and as such the incumbent may lose its ability to effectively process calls. Therefore, it is desirable to process calls to avoid this congestion in the network.

SUMMARY OF THE INVENTION

From the foregoing, it may be appreciated by those skilled in the art that a need has arisen for an improved technique to handle calls in a number portability environment. In accordance with the present invention, a system and method of performing forced default routing of calls are provided that substantially eliminate or reduce disadvantages and problems associated with conventional number portability call processing techniques.

According to an embodiment of the present invention, there is provided a method of performing forced default routing of calls that includes receiving an initial address message associated with a call placed to a called party number. A forward call indicator bit is identified within the initial address message. A determination is made as to whether the forward call indicator bit is in a first state, the first state indicating that a local number portability query has not been performed for the initial address message. In response to determining that the forward call indicator bit was received in the first state, the forward call indicator bit is placed into a second state. The initial address message is transmitted for subsequent processing of the call based on the called party number without performing a local number portability query.

The present invention has various technical advantages over conventional number portability processing techniques. For example, one technical advantage is to force processing of a call based on the called party number without going through a database query. Another technical advantage of the present invention is to eliminate use of the Generic Address Parameter in the Initial Address Message. Yet another technical advantage is to provide query relief at tandem switches. Other technical advantages may be readily apparent to those skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numbers represent like parts, in which.

DETAILED DESCRIPTION OF THE INVENTION

Figure 1:
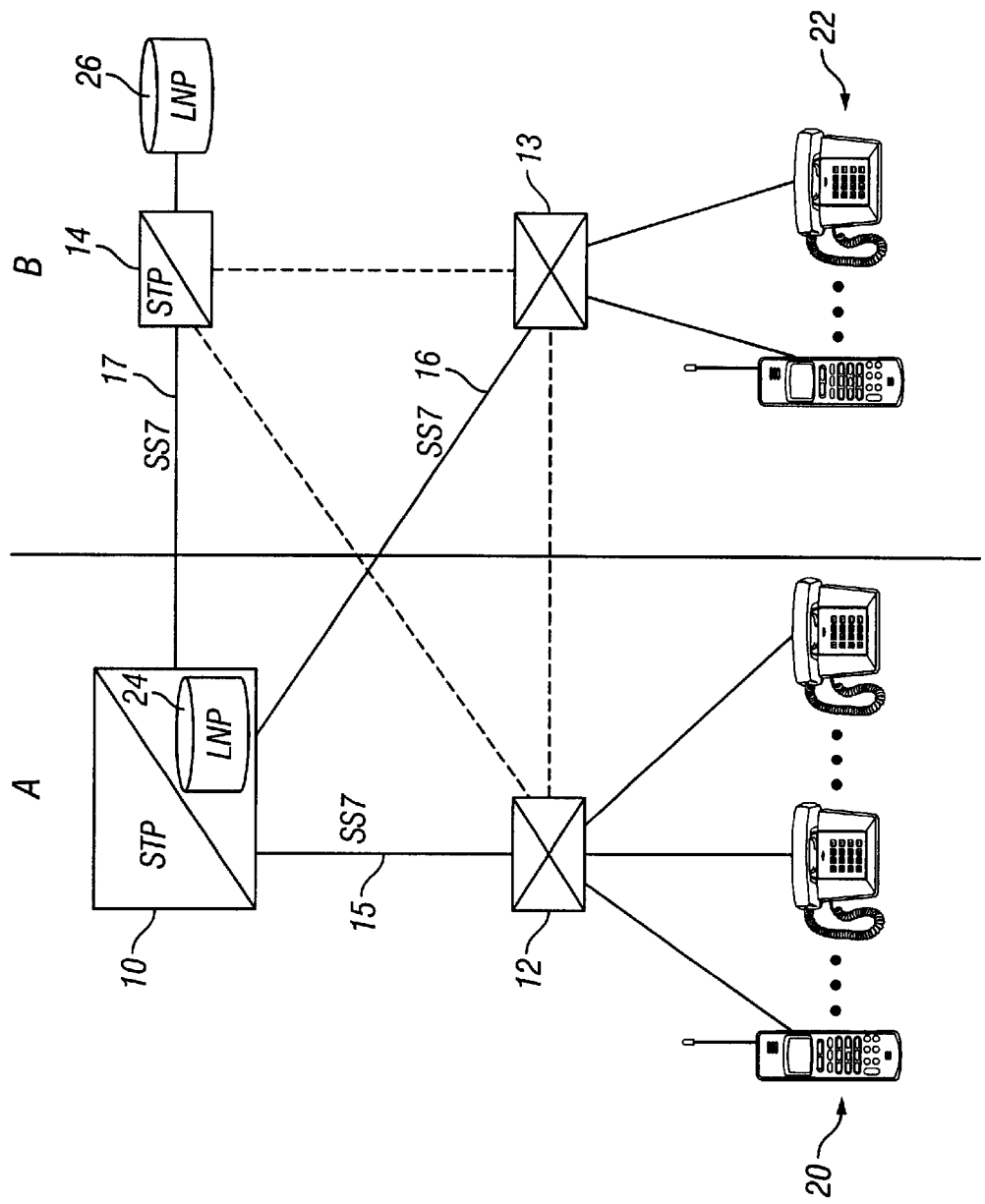
FIG. 1 illustrates a block diagram of a telecommunications network.

FIG. 1 shows a telecommunications network 1. Telecommunications network 1 includes a signal transfer point 10 coupled to one or more service switching points 12 and 13 via Signalling System Number 7 (SS7) link sets 15 and 16. Signal transfer point 10 is also coupled to at least one other signal transfer point 14 via SS7 link sets 17. Service switching points 12 and 13 are further interconnected by trunks and may include a mobile services switching center (MSC) of a wireless service provider and one or more access tandem switch. Service switching points 12 and 13 are coupled to or otherwise in communication with telecommunications equipment 20 and 22 of telephone service subscribers. In order to perform local number portability (LNP), signal transfer point 10 and 14 each have access to an LNP database 24 and 26, respectively. LNP databases 24 and 26 contain the ported telephone numbers and the corresponding local routing numbers. If service switching point 12 of a service provider does not have LNP capabilities, it may have a business arrangement with another service provider who owns signal transfer point 14 to provide the LNP lookup in its LNP database 26 to obtain the local routing numbers. However, the cost of these types of arrangements are becoming cost prohibitive.

Number Portability (NP) as defined today, puts the decision to query the NP database in the hands of the switching system. Using FIG. 1, calls are routed from service switching point 12 in network A to service switching point 13 in network B. If network A has not performed an NP query prior to delivery of the call to network B, then it will be up to network B to perform the query. Even if the call is to a non-ported subscriber (in a portable area), network B in this example will in most cases be required to perform the query.

Incoming internetwork calls are typically delivered to a receiving network's service switching point. If the Forward Call Indicators (FCI) "m" bit is NOT set and the dialed number is served within a portable area, then the access tandem would be forced to launch a query to determine the proper route for the call. The capability defined herein intercepts messages incoming on STP link sets. This capability sets the FCI "m" bit if it has not already been set. The setting of this bit instructs the receiving switch to not perform the query and to route based on the Called Party Number field. Calls to subscribers within the receiving network are delivered to subscribers' serving switches. Calls to subscribers not in the receiving network receive vacant call treatment back to the originating network.

The Forward Call Indicators (FCI) "m" bit is currently carried in the mandatory FCI parameter within the Integrated Services Digital Network User Part (ISUP) Initial Address Message (IAM) used for call setup. This FCI "m" bit is set by the switch performing an NP query. The setting of the bit indicates to downstream switches and networks that a query to the NP database has been performed and is therefore not needed.

Forced Default Routing (FDR) is a Signal Transfer Point (STP) capability that monitors number portability traffic received from other networks and sets the query indication based on message investigation applied against default and specified criteria. This achieves the desired results in the receiving network albeit to prevent network event impacts or to provide cost recovery financial management.

Forced Default routing (FDR) is a capability that interrogates each through-switched ISUP IAM message. The FDR capability interrogates IAM messages received over designated link sets to see if the FCI "m" bit has value zero (i.e., an associated NP query has not been performed for this message).

This capability could potentially inhibit call delivery to subscribers that ported into the receiving network and whose associated call setup messages indicate that the call has not been dipped. To address this case, queries to the STP's NP Database are performed to see if the dialed number belongs to a subscriber in the receiving network. If the subscriber belongs to the receiving network, the FCI "m" bit is not set thus instructing the receiving network's switches to perform the NP query.

Figure 2:
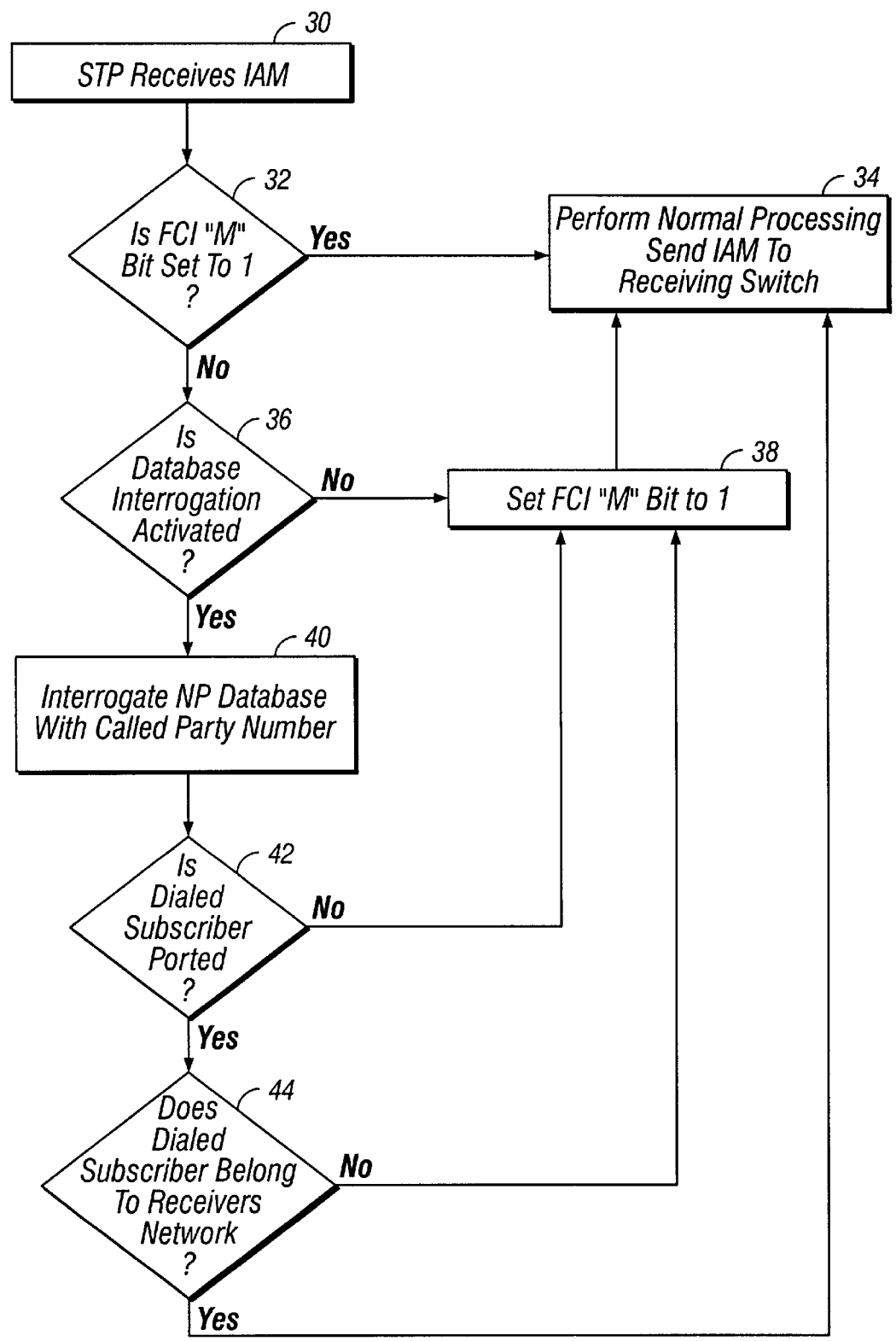
FIG. 2 illustrates a process to perform forced default routing in a signal transfer point of the telecommunications network.

FIG. 2 shows the processing at signal transfer point 10 in performing forced default routing. The process begins at step 30 where signal transfer point 10 receives an IAM from service switching point 12. The IAM indicates that a subscriber 20 has initiated a call by dialing a called party number. Signal transfer point 10 determines whether the FCI "m" bit in the IAM is set at step 32. If so, a local number portability query has already been performed for this call and normal STP processing for the call occurs with the IAM being sent to the receiving service switching point 13 at step 34.

If the FCI "m" bit is not set, a check is made to see if NP database interrogation is activated at step 36. If not activated, the FCI "m" bit is set to one at step 38 followed by normal processing at step 34. If activated, interrogation with LNP database 24 begins at step 40. The called party number is used to interrogate LNP database 24. The result of the interrogation determines whether the dialed subscriber has been ported and belongs to the receiving network.

At step 42, if the dialed subscriber has not been ported, then the FCI "m" bit is set to one at step 38 followed by normal processing at step 34. If the dialed subscriber has been ported, process flow proceeds to step 44 to see if the dialed subscriber belongs to the receiving network. If the dialed subscriber does not belong to the receiving network, the FCI "m" bit is set to one at step 38 followed by normal processing at step 34. If the dialed subscriber belongs to the receiving network, The FCI "m" bit is not changed and remains at zero and normal processing occurs at step 34. With the FCI "m" bit at zero, the receiving service switching point 13 and signal transfer point 14 perform the LNP database query check.

TABLE 1

FDR DECISION TABLE
Table I summarizes the forced default routing process discussed above.

| Case No. | Rec'vd FCI "m" bit value | Option on y/n? | Query NP DB y/n? | Ported y/n? | Receiving Network y/n? | Set "m" bit to one |
|---|---|---|---|---|---|---|
| 1. | 1 | — | — | — | — | — |
| 2. | 0 | n | n | — | — | y |
| 3. | 0 | y | y | y | y | n |
| 4. | 0 | y | y | y | n | y |
| 5. | 0 | y | y | n | — | y |

— = ignore

Upon completion of the above procedures, the ATP sends the FDR processed IAM to the originally intended receiving service switching point 13. Upon receipt of the message, receiving service switching point 13 performs normal NP procedures. It queries LNP Database 26 if the FCI "m" bit is zero and then routes according to normal NP procedures. If the FCI "m" bit is one, it routes the call as indicated to a destination switch. If the dialed subscriber resides on the destination switch, then normal treatment is applied (i.e., attempt delivery to dialed subscriber). If the dialed subscriber is not resident to the destination switch, the call is dropped with treatment sent back to the originator. This capability has no interaction with the GAP parameter.

FDR permits call delivery to all incumbent subscribers in a receiving network. Special procedures are required to ensure processing of subscribers that have ported into or within the receiving network. The FCI bit is not set if the dialed subscriber is found to be a ported subscriber belonging to the receiving network, thus allowing call delivery to the destination switch via normal NP procedures. The FCI bit is set to one if the dialed subscriber is not a subscriber of the receiving network, thus resulting in eventual vacant code treatment at the destination switch.

Several alternatives exist for determining if the dialed subscriber belongs to the receiving network. Each alternative is optional and selectable by the customer. In a first alternative, the ported subscriber's LRN is checked against a network specific LRN. In this first alternative, the dialed number is used to retrieve the LRN from LNP database 24. The LRN is then checked against a list of network specific LRNs. The subscriber is identified as belonging to the receiving network if the retrieved LRN is found in the network specific LRN list. The subscriber is identified as not belonging to the receiving network if the retrieved LRN is not found in the network specific LRN list.

In a second alternative, the ported subscriber's Service Provider is checked. The Service Provider Identifiers for the old and new networks are downloaded from the Number Portability Administration Center (NPAC) to the Local SMS for each ported subscriber. With this alternative, the Local SMS needs to download the "new" service provider identifier with each ported subscriber record sent to LNP database 24. A service provider identifier is associated with each ported subscriber record in LNP database 24. The dialed number is used to access the subscriber's record in LNP database 24 and interrogate the Service Provider Identifier field to determine if the subscriber belongs to the receiving network.

In a third alternative, the destination point code (DPC) in the Calling Name Delivery (CNAM) Global Title Translation (GTT) entry for the dialed subscriber number is checked. The dialed number is used to access the Calling Name Delivery (CNAM) Global Title Translation (GTT) entry in LNP database 24 and retrieve the destination point code (DPC) field. If the Network Identifier field of the retrieved DPC is that of the receiving network, then the subscriber is identified as belonging to the receiving network.

IAM messages for calls to ported subscribers identified as belonging to other networks may optionally be discarded based on user provisioning. To perform the screening function, the capability to identify network owned ported subscribers is required. Provisioning for this screening capability is provided on a link set basis.

Case 5, Table 1 provides the capability where the FCI "m" bit is set to one if the dialed subscriber is not ported. This capability is called Non-Ported Intercept Processing (NIP). The NIP capability is an option available with the other capabilities or as a stand-alone capability. It is activated on a link set basis.

The present invention provides local number portability query relief at service switching points and access tandems of a telecommunications network. By pre-processing the IAMs, failures at the switching points in the network due to query message overload may be avoided. Policing functions may be performed for networks refusing to pay query charges. A firewall may be established from events that occur in adjacent networks. Subscriber ownership can be determined as well as screening of LNP data.

Thus, it is apparent that there has been provided, in accordance with the present invention, a system and method of performing forced default routing of calls in a signal transfer point are provided that satisfy the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of performing forced default routing of calls, comprising:

receiving an initial address message associated with a call destined for a dialed subscriber according to a called party number;

identifying a forward call indicator bit within the initial address message;

determining whether the forward call indicator bit is in a first state, the first state indicating that a local number portability query has not been performed for the initial address message;

determining whether a database interrogation capability is activated in response to the forward call indicator bit being in the first state;

placing the forward call indicator bit into a second state in response to the database interrogation capability not being activated;

transmitting the initial address message for subsequent processing of the call according to the called party number without performing a local number portability query.

2. The method of claim 1, further comprising:

transmitting the initial address message for subsequent processing of the call in response to the forward call indicator bit not being in the first state.

3. The method of claim 1, further comprising:

interrogating a database with the called party number in response to the database interrogation capability being activated.

4. The method of claim 3, further comprising:

determining whether the dialed subscriber has been ported in response to the interrogation.

5. The method of claim 4, further comprising:

placing the forward call indicator bit into a second state in response to the dialed subscriber not being ported.

6. The method of claim 4, further comprising:

determining whether the dialed subscriber belongs to a receiving network in response to the dialed subscriber being ported.

7. The method of claim 6, further comprising:

placing the forward call indicator bit into a second state in response to the dialed subscriber not belonging to the receiving network.

8. The method of claim 6, further comprising:

transmitting the initial address message for subsequent processing of the call in response to the dialed subscriber belonging to the receiving network, the forward call indicator bit remaining in the first state.

9. The method of claim 1, wherein all steps are performed in a signal transfer point of a telecommunications network.

10. The method of claim 6, wherein determining whether the dialed subscriber belongs to a receiving network includes:

retrieving a local routing number associated with the called party number;

comparing the retrieved local routing number to a list of network specific routing numbers, the dialed subscriber belonging to the receiving network in response to the retrieved local routing number also being in the list of network specific routing numbers.

11. The method of claim 6, wherein determining whether the dialed subscriber belongs to a receiving network includes:
- accessing a record of the dialed subscriber according to the called party number;
- comparing a service provider identifier in the dialed subscriber's record to the receiving network, the dialed subscriber belonging to the receiving network upon such indication provided by the service provider identifier.

12. The method of claim 6, wherein determining whether the dialed subscriber belongs to a receiving network includes:
- accessing a calling name delivery global title translation entry associated with the called party number;
- retrieving a destination point code field in the entry;
- comparing a network identifier in the destination point code field to the receiving network, the dialed subscriber belonging to the receiving network in response to the network identifier having a value corresponding to the receiving network.

13. A telecommunication system for performing forced default routing of calls, comprising:
- an originating service switching point operable to process a call to a dialed subscriber in response to a called party number received from an originating subscriber;
- a signal transfer point operable to receive an initial address message from the service switching point, the initial address message including the called party number and a forward call indicator bit, the signal transfer point operable to determine whether the forward call indicator bit is in a first or second state, the first state indicating that a local number portability query has not been performed for the initial address message, the signal transfer point operable to determining whether a database interrogation capability is activated in response to the forward call indicator bit being in the first state, the signal transfer point operable to place the forward call indicator bit into a second state in response to the database interrogation capability not being activated, the signal transfer point operable to transmit the initial address message for subsequent processing of the call according to the called party number without performing a local number portability query.

14. The system of claim 13, wherein the signal transfer point is operable to transmit the initial address message for subsequent processing of the call in response to the forward call indicator bit being in the second state.

15. The system of claim 13, further comprising:
- a database coupled to the signal transfer point, the signal transfer point operable to interrogate the database with the called party number in response to the database interrogation capability being activated.

16. The system of claim 15, wherein the signal transfer point is operable to determine whether the dialed subscriber has been ported in response to the interrogation, the signal transfer point operable to place the forward call indicator bit into a second state in response to the dialed subscriber not being ported.

17. The system of claim 15, wherein the signal transfer point is operable to determine whether the dialed subscriber has been ported in response to the interrogation, the signal transfer point operable to determine whether the dialed subscriber belongs to a receiving network in response to a determination that the dialed subscriber has been ported, the signal transfer point operable to place the forward call indicator bit into a second state in response to the dialed subscriber not belonging to the receiving network.

18. The system of claim 15, wherein the signal transfer point is operable to determine whether the dialed subscriber has been ported in response to the interrogation, the signal transfer point operable to determine whether the dialed subscriber belongs to a receiving network in response to a determination that the dialed subscriber has been ported, the signal transfer point operable to transmit the initial address message for subsequent processing of the call in response to the dialed subscriber belonging to the receiving network, the forward call indicator bit remaining in the first state.

19. The system of claim 13, further comprising:
- a receiving service switching point operable to receive the initial address message from the signal transfer point, the receiving service switching point operable to process the call according to the initial address message.

20. The system of claim 19, further comprising:
- a receiving signal transfer point operable to receive the initial address message from the receiving service switching point in order to complete the call according to the initial address message.

* * * * *